United States Patent [19]

Katumata

[11] Patent Number: 4,947,554

[45] Date of Patent: Aug. 14, 1990

[54] CLOTH CUTTING APPARATUS

[75] Inventor: Yasuo Katumata, Yokohama, Japan

[73] Assignee: KM Cloth Cutting Machine Co., Ltd., Japan

[21] Appl. No.: 299,769

[22] Filed: Jan. 23, 1989

[30] Foreign Application Priority Data

Jan. 22, 1988 [JP] Japan .............................. 63-5891[U]

[51] Int. Cl.[5] ........................ B26B 27/00; B26B 19/04; B24B 7/00; B23Q 3/00

[52] U.S. Cl. ..................................... 30/275.4; 30/253; 30/296.1; 51/56 R; 269/289 R

[58] Field of Search ..................... 30/2.2, 2.8, 10, 108, 30/109, 110, 118, 296 R, 241, 253; 69/11; 83/925, 936; 51/56 R, 34 C; 269/289 R

[56] References Cited

U.S. PATENT DOCUMENTS 4,102,374 7/1978 Klein .............................. 269/289 R 4,155,201 5/1979 Amundsen .......................... 51/34 C 4,403,416 9/1983 Adachi .............................. 83/925 CC 4,435,902 3/1984 Mercer et al. ..................... 30/296 R 4,557,051 12/1985 Jung ................................ 83/925 CC 4,803,781 2/1989 Jung et al. ....................... 83/925 CC

*Primary Examiner*—Douglas D. Watts

*Assistant Examiner*—Paul M. Heyrana

*Attorney, Agent, or Firm*—Levisohn, Lerner & Berger

[57] ABSTRACT

A cloth cutting apparatus comprising a first arm rotatably attached to a pillar arranged movably along a table, a second arm rotatably connected to the top end of the first arm and a cutter attached to the top end of the second arm. The second arm comprises two parallel arm members, both the ends of which are rotatably supported by a supporting member. A cylinder in which a high-pressure gas is sealed is arranged between a supporting member for the first arm and one of said arm members. The position of attachment of a piston shaft of the cylinder at the supporting member is transferable.

4 Claims, 4 Drawing Sheets

CLOTH CUTTING APPARATUS

BACKGROUND OF THE INVENTION

The present device relates to a cloth cutting apparatus for cutting piled layers of cloth.

An apparatus for cutting a plurality of piled layers of cloth expanded on a table along a cut by a cutter supported by a bendable arm moving along the table is disclosed in Japanese Utility Model publication No. 60-29438.

This technique will now be described with reference to the side view of FIG. 3 and the plane view of FIG. 4.

Incidentally, in the drawings, reference numeral 1 represents a table and reference numerals 2 and 3 represent rails attached to the table 1.

Reference numeral 4 represents a pillar moving along the table 1 on the rails 2 and 3, reference numeral 5 represents a first arm rotatably supported on the pillar 4, and reference numeral 6 represents a second arm rotatably attached to the first arm 5.

A cutter 7 is attached to the top end of the second arm 6, and the cutter 7 is upwardly urged by a spring, not shown in the drawings, so that a base 8 of the cutter 7 impinges to the table 1 with a small contact force.

In the cutting apparatus having the above-mentioned structure, the cutter 7 can be optionally moved on the table 1 while being supported by the second arm 6, as shown in FIG. 3, and a plurality of piled layers expanded on the table can be cut along a cut by this cutter.

In the above-mentioned conventional technique, the contact pressure between the base 8 and the table 1 is very delicate and differs greatly according to the skill of a worker, and the contact pressure is also varied according to the weight of the cutter attached. A repulsive force by a spring is insufficient cope with these changes of the contact pressure.

The base should be located horizontally to the table, but since the base is supported by two long arms, setting of the base is very difficult and the set position is apt to get out of order. Moreover, the height of the base in the vertical direction can hardly be adjusted in the left-right direction and front-rear direction. Accordingly, the conventional technique involves difficult problems in the practical operation.

SUMMARY OF THE INVENTION

In accordance with this invention a cloth cutting apparatus which can change the angle of the second arm to the table is provided.

More particularly, the present invention directed to a cloth cutting apparatus comprising a second arm comprises two parallel arm members, both the ends of which are rotatably supported by a supproting member, a cylinder in which a high-pressure gas is sealed is arranged between a supporting member for the first arm and one of said arm members, and the position of attachment of a piston shaft of the cylinder at the supporting member is transferable, is provided.

In the above-mentioned structure, the supporting force for the second arm is changed by changing the attachment angle of the cylinder by moving the connecting position of the end portion of the piston shaft, whereby the contact pressure of the base to the table can be optionally selected. That is, a worker can select a desirable contact pressure.

Moreover, exchange of the cutter becomes possible, and by shifting the connecting position of the end portion of the piston shaft according to the weight of the cutter, the contact pressure of the base to the table can be appropriately determined in the same manner as described above.

Accordingly, it is a primary object of the present invention to provide a cloth cutting apparatus in which the base of the cutter can be uniformly contacted with the table under a desirable contact pressure, and cloth on the table can be smoothly cut along a cut.

It is an object of the present invention to provide a cloth cutting apparatus inwhich a contact pressure of the base of the cutter attached to the second arm to the table can be optionally set.

It is a further object of the invention to provide a cloth cutting apparatus in which a right contact pressure of the base of the cutter of various sizes to the table can be obtained.

It is a further object of the invention to provide a cloth cutting apparatus in which the left-right angle adjustment of the base of the cutter attached to the top end of the second arm can be performed.

It is an additional object of the invention to provide a cloth cutting apparatus in which the front-rear angle adjustment of the base of the cutter attached to the top end of the second arm can be performed.

DETAILED DESCRIPTION

An example of the present device will now be described with reference to the accompanying drawings.

Figure 1:
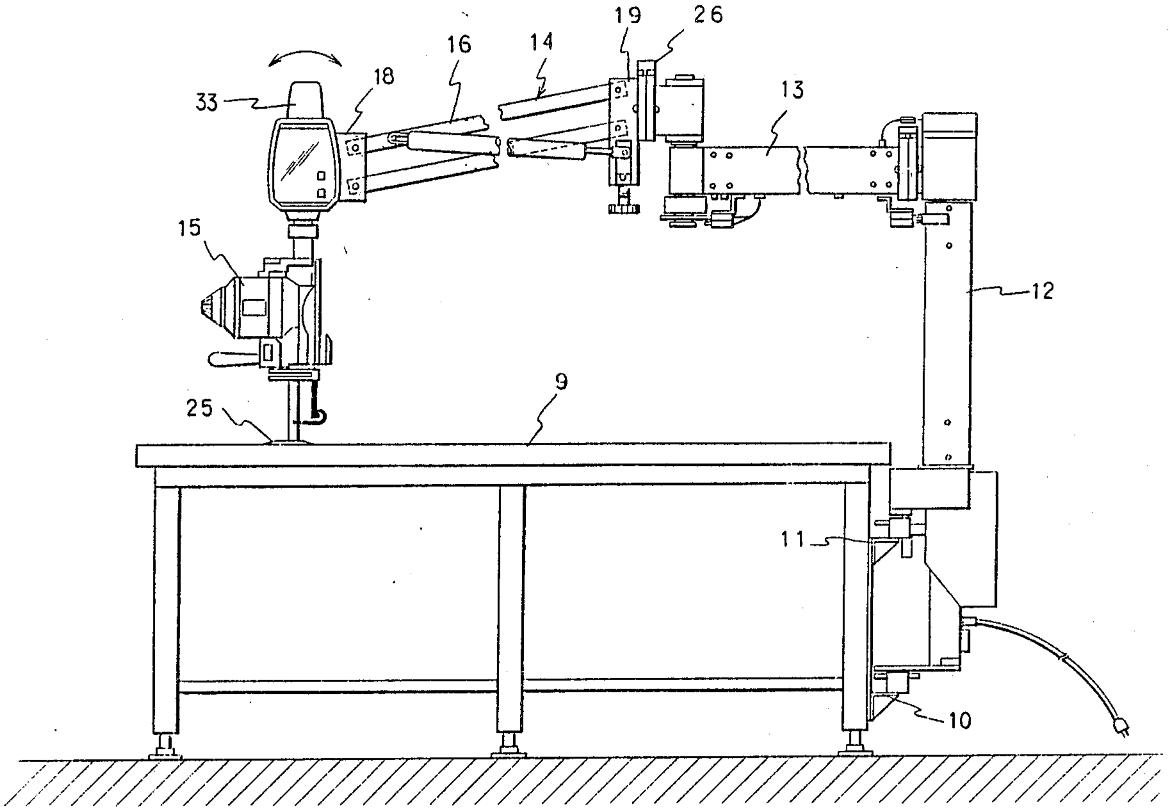
FIG. 1 is a side view showing the entire structure of one example of the present device.
Figure 2:
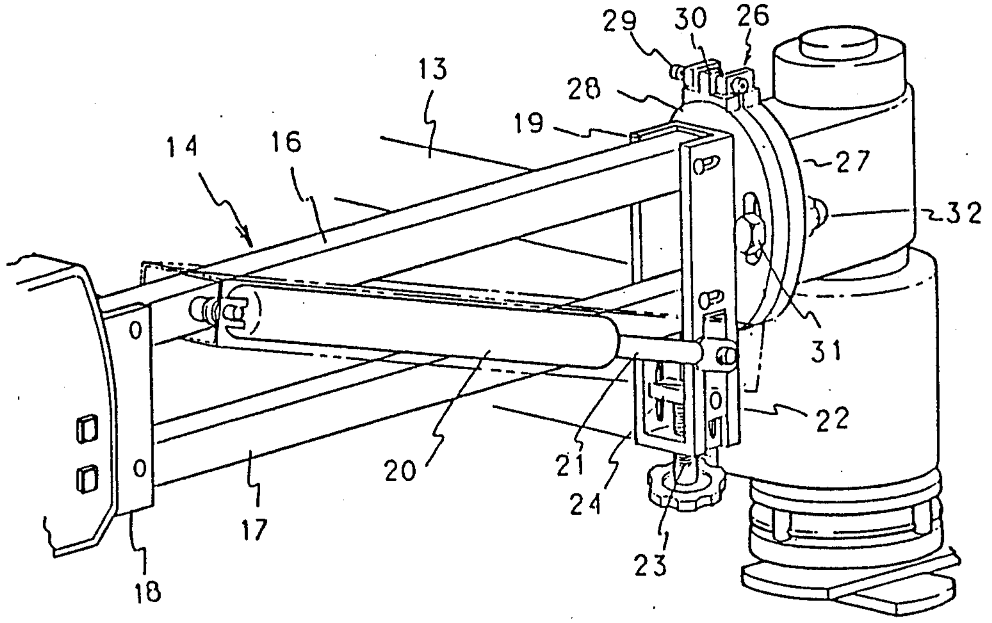
FIG. 2 is an enlarged perspective view showing a main part of the example shown in FIG. 1.
Figure 3:
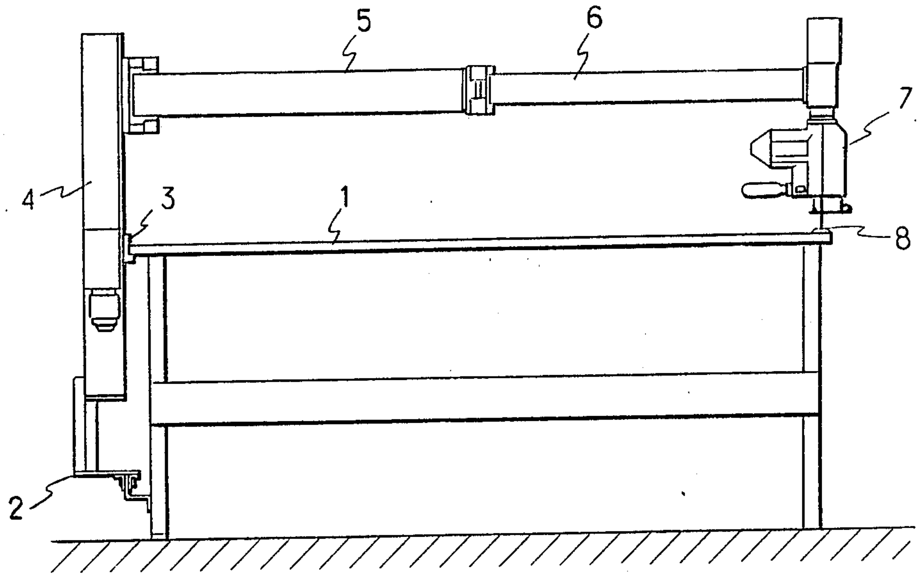
PRIOR ART Fig. 3
FIG. 3 is a side view showing the conventional technique.
Figure 4:
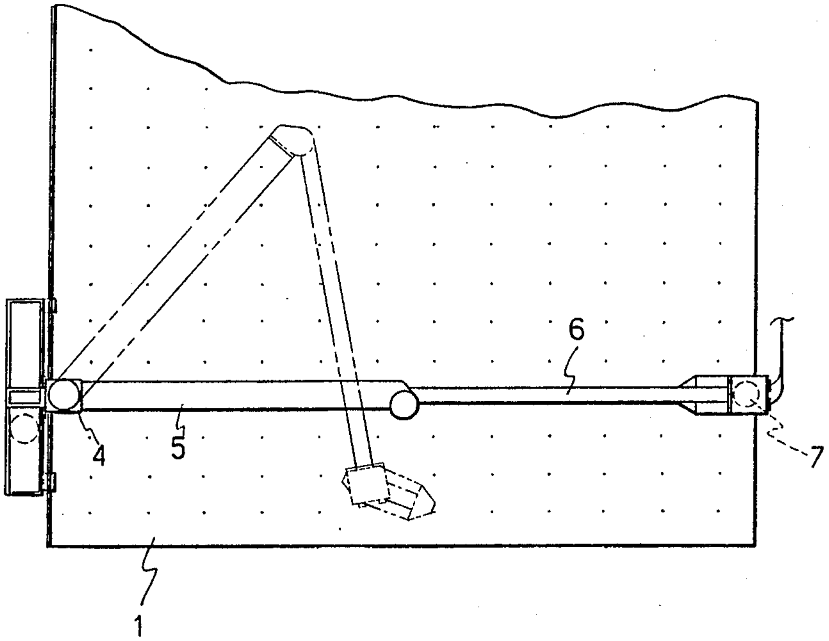
PRIOR ART Fig. 4
FIG. 4 is a plane view of the conventional technique.

FIG. 1 is a side view illustrating the entire structure and FIG. 2 is an enlarged perspective view illustrating a main part of the structure. In the drawings, reference numeral 9 represents a table, reference numerals 10 and 11 represent rails laid out in the side portion of the table 9, and reference numeral 12 represents a pillar which is arranged so that the pillar 12 can move along the side portion of the table 9 on the rails 10 and 11.

Reference numeral 13 represents a first arm which is attached to the pillar 12 so that the first arm 13 can rotate in the horizontal direction, reference numeral 14 represents a second arm which is connected to the first arm 13 so that the second arm 14 can rotate in the horizontal direction and the connection angle can be adjusted, as described hereinafter, and reference numeral 15 represents a cutter attached to the top end of the second arm 14.

The second arm 14 comprises two arm members 16 and 17, both the ends of which are supported by supporting members 18 and 19 so that the arm members 16 and 17 are kept in parallel to each other and can be moved while keeping the parallel relation. Reference numeral 20 represents a cylinder in which a high-pressure gas is sealed, and a piston shaft 21 of the cylinder 20 has an end portion which is rotatably connected to the supporting member 16, as explained hereinafter. The top end of the cylinder 20 is rotatably connected to the vicinity of the end portion of the arm member 16.

The supporting member 19 has a slider 22 vertically movably supported to the lower part thereof, and the end portion of the piston shaft 21 is connected to the slider 22. This slider 22 is connected to the lower end of the supporting member 19 through a vertically moving adjustment screw 23 and a connecting member 24, and by turning this adjustment screw 23, the slider 22 is moved to shift the connecting position of the end portion of the piston shaft 21, whereby the attachment angle of the cylinder 20 is changed to change the supporting force for the arm 14. Namely, if the position is shifted downward, the supporting force increases, and if the position is shifted upward, the supporting force decreases.

At least one of the supporting members 18 and 19 is connected to one or both of the arm members 16 and 17 through a long hole or a large-diameter hole so that the connecting position can be changed. By this change of the connecting position, the cutter 15 is slightly moved in the direction indicated by the arrow in FIG. 1 and the front-rear angle adjustment of the base 25 of the cutter 15 in the vertical direction can be performed.

An angle-adjusting member 26 is arranged in the vicinity of the connecting portion between the second arm 14 and the first arm 13, and for example, the angle-ajusting member 26 comprises two disks 27 and 28, an adjustment screw 29 attached to the circumference of the disk 27 and an adjustment projection 30 formed on the disk 28 and screwed with the adjustment screw 29. The two disks 27 and 28 are secured by a bolt 31 and a nut 32, and the bolt hole is a long hole or a large-diameter hole. Accordingly, if the bolt 31 is loosened and the adjustment screw 29 is turned, the disk 28 is turned through the adjustment projection 30, whereby the second arm 14 is turned clockwise or counterclockwise.

By this turning of the second arm 14, the cutter 15 is moved in the direction of the arrow and in the vertical direction, and the left-right angle adjustment of the base 25 of the cutter 15 in the vertical direction can be accomplished.

Reference numeral 33 represents a shock absorber for damping vibrations of the cutter 15.

In the above-mentioned structure, at first, in the connecting portion of the supporting member 18 (or 19) to the arm members 16 and 17, the front-rear angle adjustment of the base 25 of the cutter 15 in the vertical direction is performed according to the above procedures. Then, the second arm 14 is turned clockwise or counterclockwise by turning the adjustment screw 29, and the left-right angle adjustment of the base 25 of the cutter 15 in the vertical direction is performed.

According to the foregoing procedures, the angle of the base 25 of the cutter 15 can be adjusted in the front-rear direction and left-right direction with respect to the table 9, and the base 25 can be maintained horizontally to the table 9.

Then, by turning the adjustment screw 23, the slider 22 is moved to shift the connecting position of the end portion of the piston shaft 21, whereby the attachment angle of the cylinder 20 is changed to change the supporting force for the second arm 14. Thus, the contact pressure of the base 25 to the table 9 can be selected, and thereforae, a worker can select a desirable contact pressure. In general, a worker of higher skill selects a lower contact pressure. In case of a worker which is not sufficiently skilled, if the contact pressure is much reduced, the base 25 moves too lightly.

Exchange of the cutter 15 is possible in the above-mentioned structure. In this case, by turning the adjustment screw 23 according to the weight of a new cutter 15, the contact pressure of the base 25 to the table 9 can be appropriately set in the same manner as described above.

When all of the adjustments are thus completed, a handle of the cutter 15 is gripped by the hand the cutter 15 is moved on the table 9, whereby the pillar 12 is moved along the table 9, and the respective arms 13 and 14 are bent at desired angles in the connecting and the cutter 15 is moved while keeping a desirable contact pressure. Thus, the cloth on the table 9 is freely cut along a cut.

As is apparent from the foregoing description, according to the present device, the second arm is constructed by two parallel arm members, both the ends of which are rotatably supported by a supporting member, a cylinder in which a high-pressure gas is sealed is arranged between a supporting member for the first arm and one of these arm members, and the attachment position of this supporting member is made movable in the vertical direction. In this structure, by changing this attachment position, the contact pressure of the base of the cutter attached to the second arm to the table can be optionally set. In addition to this effect, even if the cutter is exchanged with a cutter of a desirable size, there can be attained an effect of optionally setting the contact pressure of the base to the table according to the newly attached cutter.

Furthermore, since an angle-adjusting member rotating with the axis of the arm being as the center is arranged in the vicinity of the connecting portion between the first and second arm, the second arm can be rotated with the axis being as the center, and therefore, the left-right angle adjustment of the base of the cutter attached to the top end of the second arm can be performed. This is another effect.

Moreover, since at least one of the two arm members is attached to at least one supporting member so that the arm member can move in the longitudinal direction, the front-rear angle adjustment of the base of the cutter attached to the top end of the second arm can be accomplished. This is still another effect.

By dint of these effects, the base of the cutter can be uniformly contacted with the table under a desirable contact pressure, and cloth on the table can be smoothly cut along a cut.

What is claimed is:

1. A cloth cutting apparatus comprising:

a first arm rotatably connected to a pillar, said first arm rotatable in a horizontal plane;

a second arm rotatably connected to said first arm at a support member, and comprising two substantially parallel arm members, said second arm rotatable in a horizontal plane;

a means for cutting cloth movably connected to said second arm, said cutting means moveable within a vertical plane defined by said second arm;

a cylinder and piston assembly connected between said second arm and said support member for defining a force for supporting the second arm; and means for selectively adjusting the contact pressure of the cutting means by altering the connection point of the cylinder and piston assembly relative to said support member.

2. The cloth cutting apparatus of claim 1 in which said support member includes means for axially rotating said second arm so as to adjust the cutting angle of said cutting means.

3. The cloth cutting apparatus of claim 2 in which said axially rotating means comprises a first disk rotatable relative to a second disk, a means for locking the position of the first disk relative to the second disk, and a means for rotating said first disk relative to said second disk.

4. The cloth cutting apparatus of claim 1 in which a connection between said second arm and said support member is through a large diameter opening which enables the cutting angle of said cutting means to be altered in the vertical plane defined by said second arm.

* * * * *